United States Patent [19]
Kim

[11] Patent Number: 5,929,917
[45] Date of Patent: Jul. 27, 1999

[54] METHOD AND APPARATUS FOR ADAPTIVELY CODING A CONTOUR OF AN OBJECT

[75] Inventor: Jin-Hun Kim, Seoul, Rep. of Korea

[73] Assignee: Daewoo Electronics Co., Ltd., Seoul, Rep. of Korea

[21] Appl. No.: 08/867,879

[22] Filed: Jun. 3, 1997

[30] Foreign Application Priority Data

Apr. 11, 1997 [KR] Rep. of Korea ............. 97-13367

[51] Int. Cl.[6] .................. H04N 7/12; H04N 5/14
[52] U.S. Cl. ............ 348/420; 348/699; 382/241; 382/242
[58] Field of Search .............. 348/15, 413, 414, 348/416, 417, 699, 700; 382/240, 243, 256, 257, 241, 242; H04N 7/12, 5/14

[56] References Cited

U.S. PATENT DOCUMENTS

| | | | |
|---|---|---|---|
| 5,592,228 | 1/1997 | Dachiku et al. | 348/416 |
| 5,633,685 | 5/1997 | Cho et al. | 348/420 |
| 5,737,449 | 4/1998 | Lee | 382/242 |
| 5,748,231 | 5/1998 | Park et al. | 348/208 |
| 5,760,846 | 6/1998 | Lee | 348/699 |

*Primary Examiner*—Bryan Tung
*Assistant Examiner*—Tung Vo
*Attorney, Agent, or Firm*—Pennie & Edmonds LLP

[57] ABSTRACT

A contour encoding method codes a current contour in a current frame based on a predicted current contour which is selected among previously reconstructed contours within a previous frame. Once the predicted current contour which is most similar to the current contour is detected, the method matches the predicted current contour with the current contour and widens the predicted current contour to thereby detect non-matching sections and matching sections between the current contour and the predicted current contour. Subsequently, the portions of the current contour which correspond to the non-matching sections are encoded through a polygonal approximation technique. The result of the approximation technique and information for the predicted current contour are multiplexed and then transmitted as encoded contour data.

17 Claims, 7 Drawing Sheets though it is possible to remedy the rough representation and computational complexity, and somewhat reduce the volume of transmission data through the use of the DST based contour approximation, it still remains desirable to further reduce the volume of transmission data in order to successfully implement a low-bit rate codec system having, e.g., a 64 kb/s transmission channel bandwidth.

METHOD AND APPARATUS FOR ADAPTIVELY CODING A CONTOUR OF AN OBJECT

FIELD OF THE INVENTION

The present invention relates to a method and apparatus for encoding a contour of an object expressed in a video signal; and, more particularly, to a method and apparatus capable of reducing the amount of transmission data through the use of a contour motion estimation technique.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is the so-called object-oriented analysis-synthesis coding technique (see Michael Hötter, "Object-Oriented Analysis-Synthesis Coding Based on Moving Two-Dimensional Objects", *Signal Processing: Image Communication* 2, 409–428 (December, 1990)).

According to the object-oriented analysis-synthesis coding technique, an input video image is divided into objects; and three sets of parameters for defining the motion, contour and pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error. The B-spline approximation technique, therefore, may result in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

Even though it is possible to remedy the rough representation and computational complexity, and somewhat reduce the volume of transmission data through the use of the DST based contour approximation, it still remains desirable to further reduce the volume of transmission data in order to successfully implement a low-bit rate codec system having, e.g., a 64 kb/s transmission channel bandwidth.

SUMMARY OF THE INVENTION

It is, therefore, a primary object of the invention to provide an improved contour encoding method and apparatus which inter-code contour information to thereby further reduce the volume of transmission data. More particularly, the present invention provides a method and apparatus for contour coding employing a contour motion estimation technique based on a difference between a current and previous contours.

In accordance with the present invention, there is provided a method for encoding a current contour based on one or more previously reconstructed contours of video image signals, comprising the steps of: (a) choosing one of the previously reconstructed contours as a predicted contour for the current contour; (b) overlapping the predicted contour with the current contour; (c) finding matching segments between the predicted and the current contours and setting two end points of each matching segment as major vertices; (d) widening the overlapped predicted contour and determining matching sections on the current contour, wherein each matching section represents a portion of the current contour overlapping with the widened contour between two major vertices; (e) setting the two major vertices at the ends of each matching section as primary vertices; (f) polygonal-approximating each non-matching section on the current contour, thereby determining secondary vertices on non-matching sections; and (g) encoding the current contour by representing each matching section by a portion of the predicted contour between two primary vertices of each matching section and the non-matching sections by the secondary vertices to thereby provide encoded current contour data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
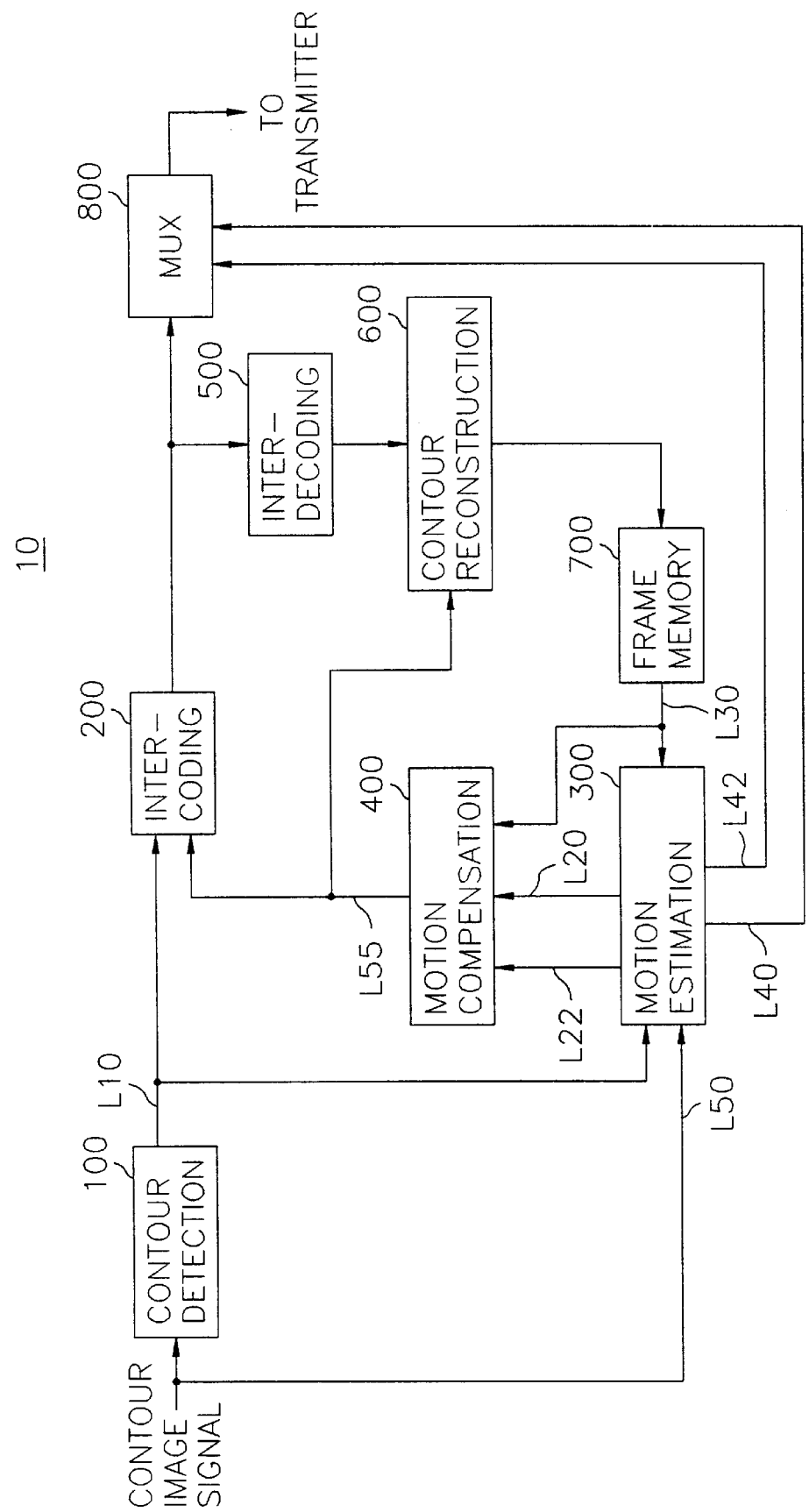
FIG. 1 represents a schematic block diagram of an apparatus for encoding a contour in accordance with the present invention.

Referring to FIG. 1, there is shown a schematic block diagram of an inventive apparatus 10 for encoding contours in a frame signal. A contour image signal of a current frame having therein one or more objects is inputted to a contour detection unit 100 and a motion estimation unit 300 via a line L50 in a form of a segmentation mask, wherein each pixel in the segmentation mask has a label identifying a region it belongs to. For instance, a pixel in a background has a label "0" and each pixel in an object is labeled by one of non-zero values.

The contour detection unit 100 detects contours from the input segmentation mask and assigns index data to each of the contours included in the contour image signal according to a processing order thereof; and sequentially outputs contour information for each of the contours in the current frame, wherein the contour information includes contour data representing positions of contour pixels on a contour and index data thereof. The contour information on a line L10 from the contour detection unit 100 is provided as current contour information to an inter-coding unit 200, and a motion estimation unit 300.

The motion estimation unit 300 detects a most similar contour to the current contour on the line L10 based on the current contour image signal on the line L50, the current contour information on the line L10 and a reconstructed previous contour image signal coupled thereto from a frame memory 700 via a line L30. The previous contour image signal is also in the form of a segmentation mask, each pixel therein having a label identifying a region it belongs to. Outputs of the motion estimation unit 300 on lines L20 and L40 are index data of the most similar contour and motion information representing a displacement between the current contour and the most similar contour. The motion estimation unit 300 will be described in detail with reference to FIGS. 2 and 3.

Figure 2:
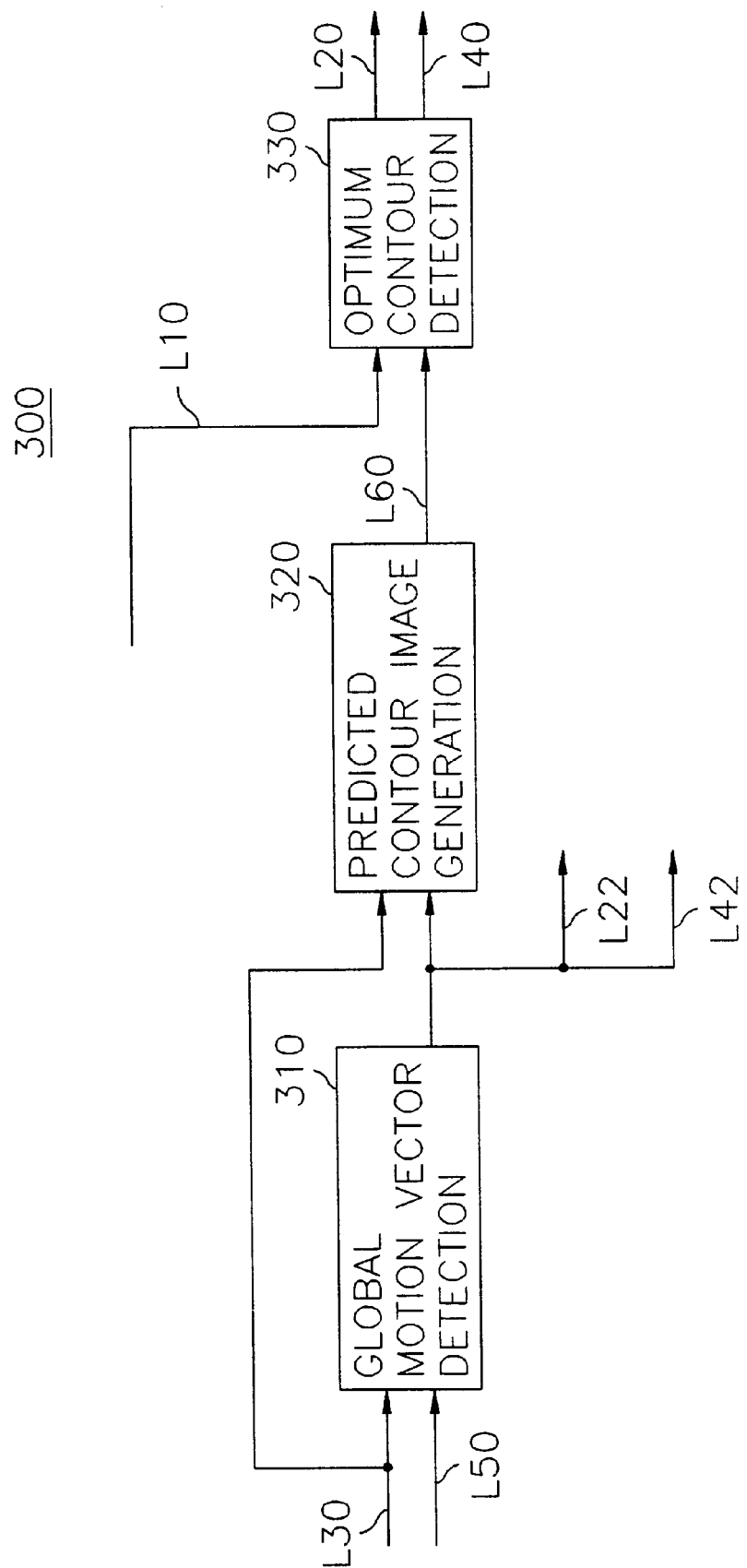
FIG. 2 provides a detailed block diagram of a motion estimation unit shown in FIG. 1.

Referring to FIG. 2, the motion estimation unit 300 includes a global motion vector detection block 310, a predicted contour image generation block 320, and an optimum contour detection block 330.

The global motion vector detection block 310, using the previous contour image signal on the line L30 and the current contour image signal on the line L50, detects a global motion vector(GMV) yielding a largest number of object pixels overlapping with each other. Detection of the GMV is carried out within a predetermined search ranges of, e.g., ±16 pixels. The GMV detected at the global motion vector detection block 310 is fed to the predicted contour image generation block 320 and provided on lines L22 and L42 leading to the motion compensation unit 400 and a multiplexor(MUX) 800, respectively.

At the predicted contour image generation block 320, the previous contour image coupled thereto via the line L30 is shifted by the GMV to produce a predicted contour image. Further, as in the contour detection unit 100 shown in FIG. 1, the predicted contour image generation block 320 detects contours in the predicted contour image. Contour information for each of the predicted contours detected at the predicted contour image generation block 320 is fed on a line L60.

At the optimum contour detection block 330, based on the predicted contour information on the line L60 and current contour information on the line L10, an optimum contour, a predicted contour most similar to the current contour is detected among predicted contours residing within a preset search range, e.g., ±8 pixels of the current contour; and local motion vector(LMV) representing a displacement between the current contour and the optimum contour and the index data of the optimum contour are outputted on the lines L20 and L40. In a preferred embodiment of the invention, the index data of the predicted contour has a same value as a label of the object pixels corresponding to the predicted contour.

Figure 3:
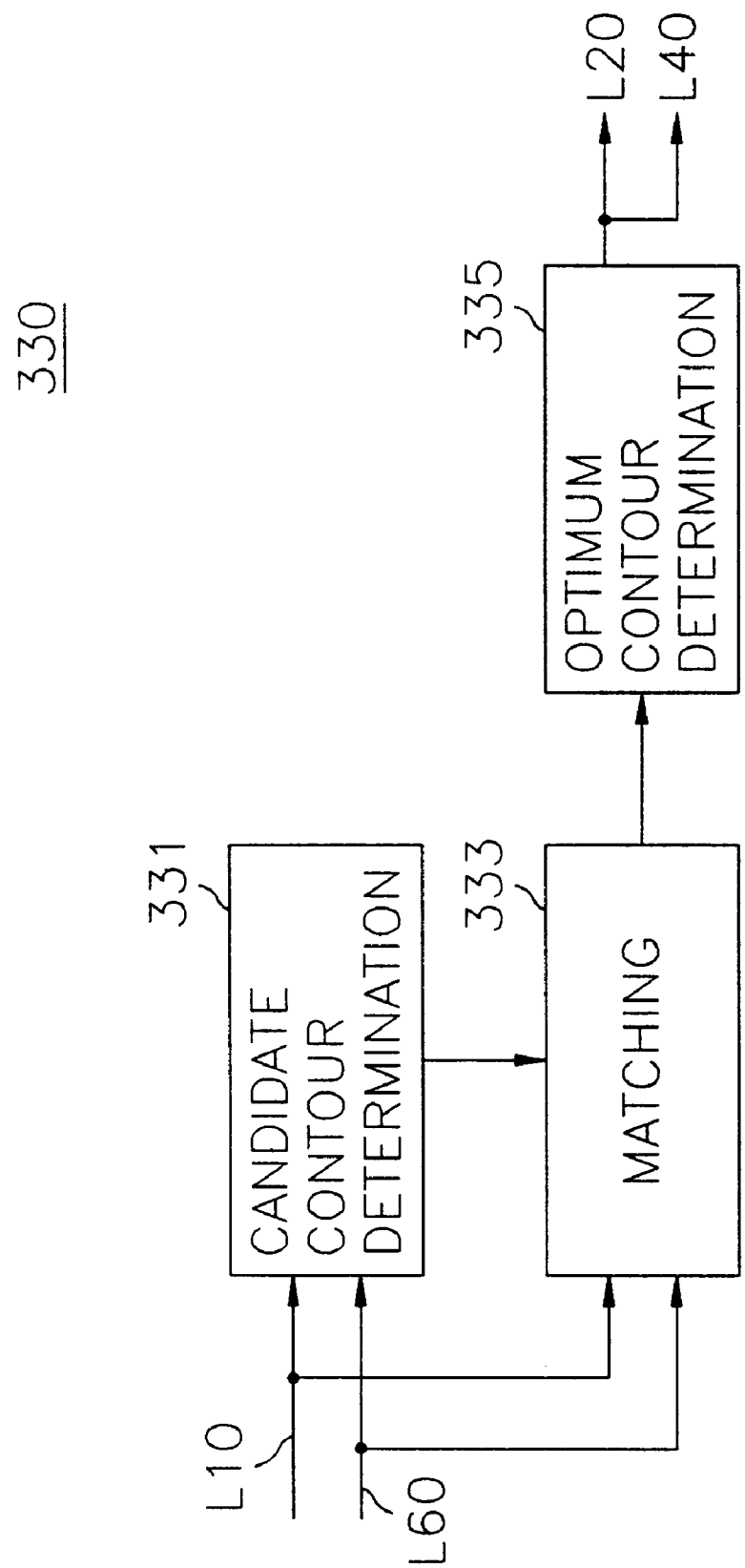
FIG. 3 shows a detailed block diagram of an optimum contour detection block shown in FIG. 2.

Referring to FIG. 3, there is shown in detail the optimum contour detection block 330, which includes a candidate contour determination sector 331, a matching sector 333, and an optimum contour determination sector 335.

The candidate contour determination sector 331 detects predicted contours residing within the preset search range from the current contour and calculates the lengths of the current and the detected predicted contours based on the current contour information and the predicted contour information on the lines L10 and L60, respectively. Thereafter, the lengths of the current contour and each of those predicted contours within the preset search range are compared. If a difference between the lengths of the current and a predicted contour is smaller than M times the shorter one of the two contours, the predicted contour is determined as a candidate contour, M being a predetermined number. After determining one or more candidate contours for the current contour, indication signals identifying those candidate contours, e.g., index data of the candidate contours, are fed to the matching sector 333. The length of a contour can be defined by, for example, the number of contour pixels which constitute the contour.

In another preferred embodiment of the invention, the candidate contours can be determined based on the numbers of object pixels positioned inside the respective contours in lieu of the lengths thereof.

Figure 5A:
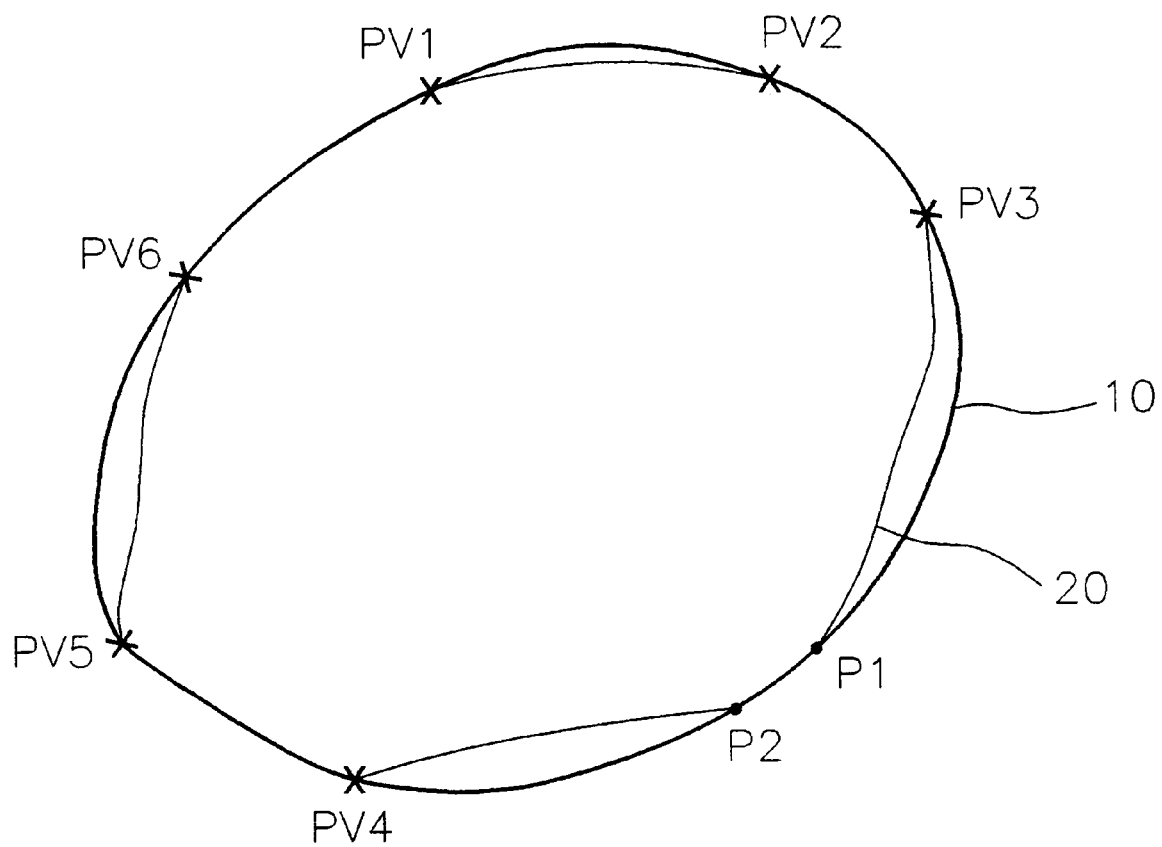
FIGS. 5A and 5B illustrate procedures of matching contours carried out by the preferred embodiments of the present invention.

The matching sector 333 retrieves contour information for each candidate contour from the predicted contour image generation block 320 via the line L60 in response to the indication signals inputted thereto. Subsequently, the current contour and a candidate contour are matched based on the current contour information on the line L10 and the candidate contour information on the line L60. After performing the matching process between the current contour and each candidate contour, the matching sector 333 provides the optimum contour determination sector 335 with matching information for each candidate block. The matching information includes index data, a motion displacement and a matching length for a candidate contour. During the matching process for a candidate contour, the candidate contour is displaced by, e.g., a one pixel basis within the preset search range, and matching segments of the current and the candidate contours at each displacement are determined. Thereafter, the total length of the matching segments is computed for each displacement. The computed lengths are then compared with one another and the largest one thereof is determined as the matching length for the candidate contour and the displacement which yields the largest length is set as the motion displacement for the candidate contour. Referring to FIG. 5A, there are illustrated details of a matching segment determination scheme. FIG. 5A depicts a current contour 10 and a candidate contour 20 overlapping with each other. After overlapping the contours 10 with 20, the intersection points therebetween such as PV1 to PV6, P1 and P2 are detected and lengths of the overlapping segments PV6-PV1, PV2-PV3, P1-P2, and PV4-PV5 are calculated. If the length of an overlapping segment is greater than a threshold value TH1, the overlapping segment is determined as a matching segment. In FIG. 5A, it is assumed that the overlapping segment between P1 and P2 is not greater than the TH1; the remaining overlapping segments are greater than the TH1. Therefore, the remaining overlapping segments, e.g., PV2 to PV3, PV4 to PV5, and PV6 to PV1, are determined as the matching segments. In another preferred embodiment of the invention, determination of the matching segment can be carried out based on the number of contour pixels residing on a given overlapping segment in lieu of the length thereof.

Figure 5B:
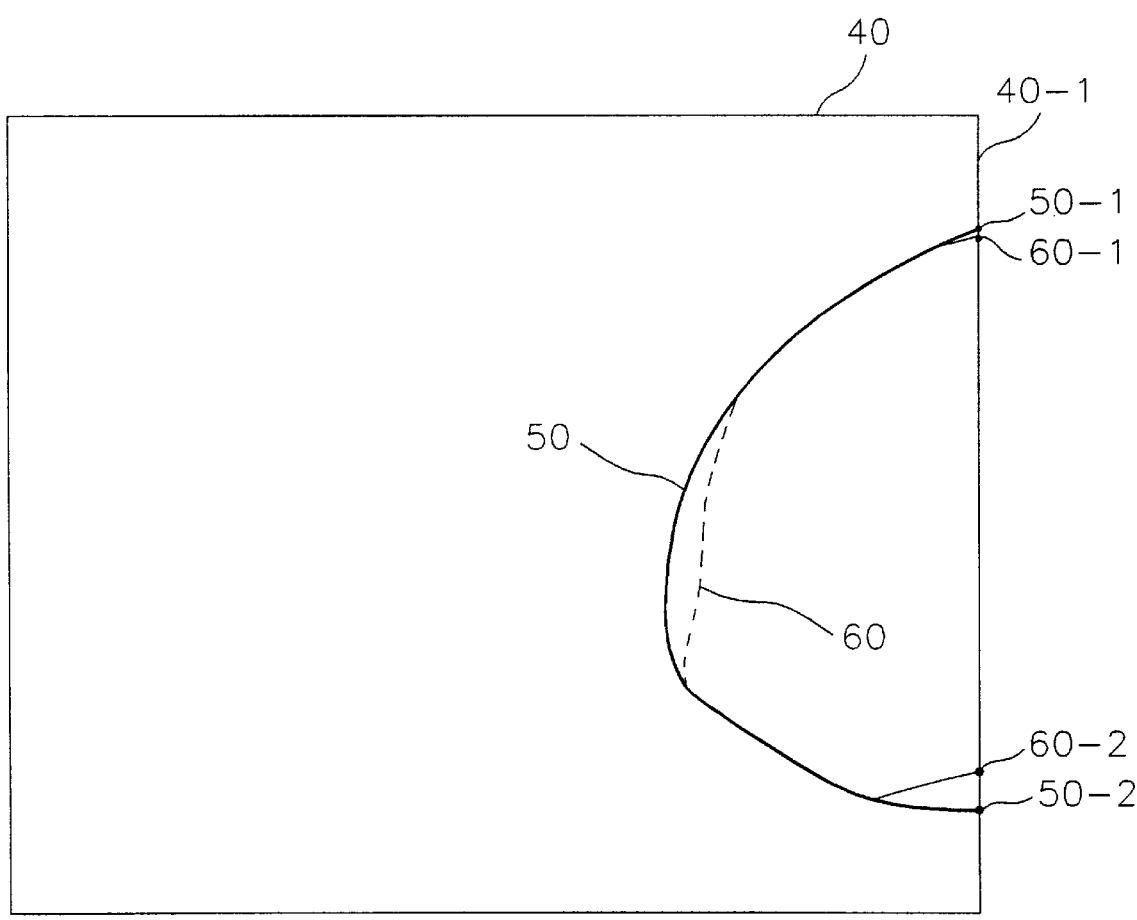

In the above matching procedure, when a contour intersects with an edge of a video frame, a portion of the edge between the intersection points are regarded as a portion of the contour. For instance, as shown in FIG. 5B, if a current contour 50 and a candidate contour 60 intersect with a right edge 40-1 of the video frame 40 at points 50-1, 50-2 and 60-1, 60-2, the portions of the edge 40-1 between the points 50-1 and 50-2 and the points 60-1 and 60-2 are treated as parts of the contours 50 and 60, respectively.

At the optimum contour determination sector 335 responsive to the matching information for each candidate contour, the matching lengths of the candidate contours are compared with each other; and a candidate contour corresponding to a matching length of a maximum value is declared as the optimum contour of the current contour. The motion displacement corresponding to the optimum contour is set as the local motion vector(LMV). Outputs from the optimum contour determination sector 335 on the lines L20 and L40 are the LMV and the index data of the optimum contour.

Referring back to FIG. 1, the motion compensation unit 400 generates a predicted current contour by retrieving the optimum contour information from the frame memory 700 via the line L30 based on the GMV on the line L22, and the LMV and the index data of the optimum contour on the line L20, wherein the predicted current contour represents the optimum contour shifted by the sum of the GMV and the LMV. The output to the inter-coding unit 200 and a contour reconstruction unit 600 provided via a line L55 from the motion compensation unit 400 is the predicted current contour information representing position data of contour pixels of the predicted current contour and index data thereof.

Figure 4:
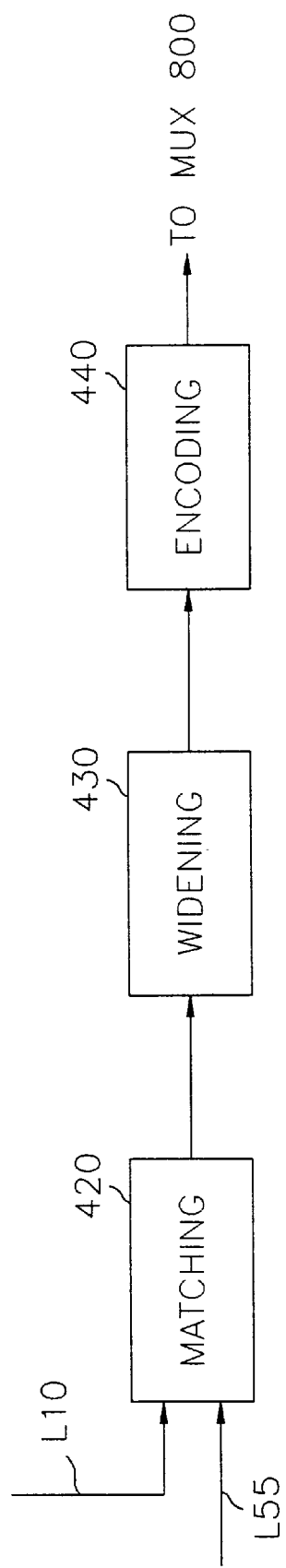
FIG. 4 is a detailed block diagram of an inter-coding unit shown in FIG. 1.

Referring to FIG. 4, there is depicted detailed block diagram of the inter-coding unit 200 which includes a matching block 420, a widening block 430 and an encoding block 440.

The predicted current contour information on the line L55 and the current contour information on the line L10 are fed to the matching block 420. At the matching block 420, the predicted current contour is matched with the current contour. The matching procedure executed at the matching block 420 is similar to the matching procedure of the matching sector 333 in FIG. 3 described hereinabove with reference to FIGS. 5A and 5B. For instance, if the contours 10 and 20 in FIG. 5A are the current contour and the predicted contour, those points PV1 to PV6, each constituting an end point of a matching segment, are determined as major vertices. The intersecting points P1 and P2 are not major vertices since the overlapping segment therebetween is not a matching segment. The matched contour is fed to the widening block 430, wherein matched contour information includes position information of contour pixels on the predicted current and the current contours and the major vertices.

Figure 6:
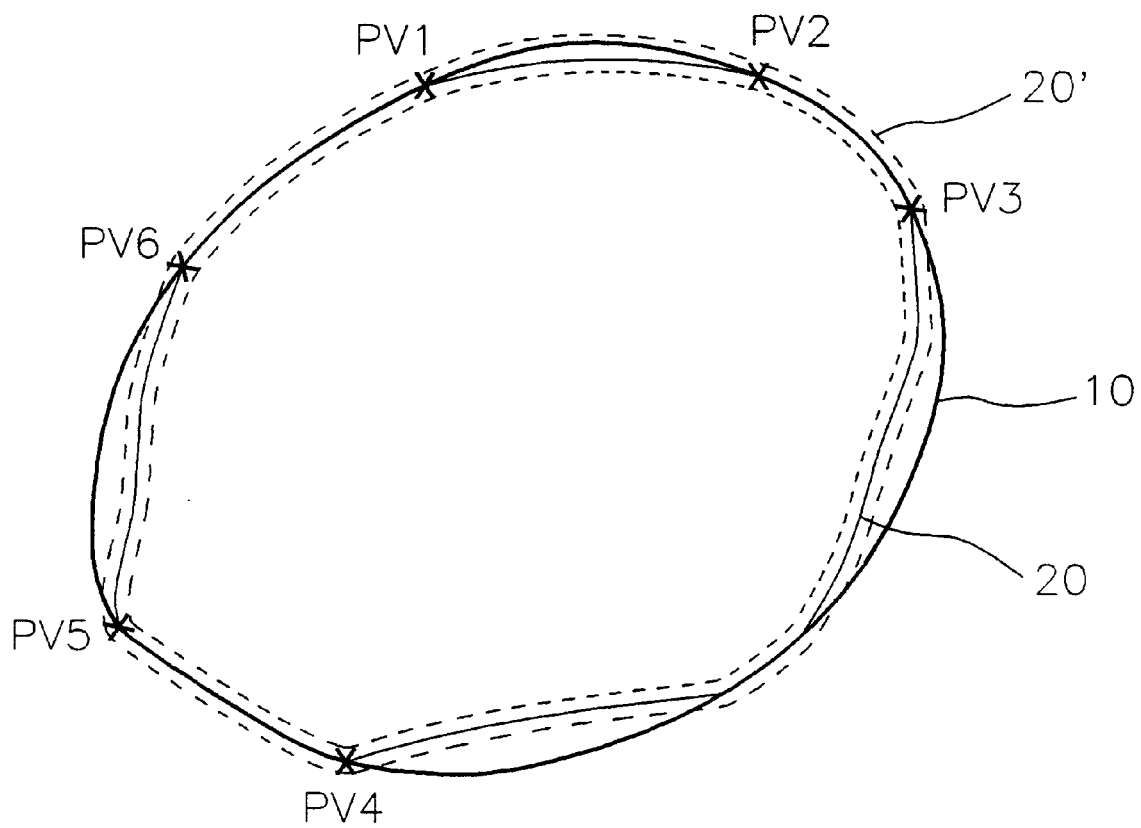
FIG. 6 depicts a widening process executed to the matching contour by the preferred embodiment of the present invention.

The widening block 430, as illustrated in FIG. 6, widens the predicted current contour 20 by a predetermined threshold Dmax to create a predicted contour band 20'. Then, the widening block 430 matches the predicted contour band 20' with the current contour 10 to find portions of the current contour overlapping with the predicted contour band 20' between a pair of major vertices inclusive. It is found, in the example given in FIG. 6, that the current contour overlaps with the predicted contour band 20' between the pairs of vertices PV6 and PV3, and PV4 and PV5. Such overlapping parts PV6 to PV3 and PV4 to PV5 of the current contour 10 are set as overlapping sections. Thereafter, a length of each overlapping section is compared with a threshold TH2 and an overlapping section longer than the threshold TH2 is determined as a matching section and major vertices at the ends of the matching section are considered as primary vertices. In the exemplary matched contour shown in FIG. 6, those pairs of the vertices PV6-PV3 and PV4-PV5 become primary vertices if the lengths therebetween are greater than TH2. In the subsequent encoding process, those matching sections are treated as being matched with the portions of the predicted current contour between each pair of the primary vertices.

The output from the widening block 430 to the encoding block 440 is matching data including position information of the primary vertices and the contour pixels of the current contour.

At the encoding block 440, vertices are determined on each of non-matching sections of the current contour, e.g., portions of the current contour 10 between primary vertices PV6-PV5 and PV4-PV3 through the use of the conventional polygonal approximation technique based on the predetermined threshold Dmax. That is, according to the conventional polygonal approximation, a contour pixel on any contour segment which has a farthest distance to a line segment corresponding thereto is determined as a vertex when the farthest distance is greater than the Dmax. Those vertices determined by the polygonal approximation are set as secondary vertices. The encoding block 440 encodes position data of the primary and the secondary vertices and provides the encoded vertex data to the MUX 800 and an inter-decoding unit 500.

At the MUX 800, the encoded vertex data, the GMV, the LMV and the index data of the optimum contour are multiplexed to provide encoded contour data to a transmitter (not shown) for the transmission thereof.

Meanwhile, at the inter-decoding unit 500, the encoded vertex data is decoded into decoded vertex data representing the decoded primary and secondary vertices and the decoded vertex data is provided to the contour reconstruction block 600.

The decoded vertex data from the inter-decoding unit 500 is utilized in reconstructing the current image signal together with the predicted current contour information fed via the line L55 at the contour reconstruction unit 600. That is, in order to a reconstructed current image signal having reconstructed current contour, portions of the reconstructed current contour which corresponds to the non-matching sections of the current contour are reconstructed based on the decoded vertex data while remaining portions are reconstructed from the predicted current contour. The reconstructed current image signal is stored at the frame memory 700 and is utilized as a reconstructed previous image signed for the next image signal.

While the present invention has been described with respect to certain preferred embodiments only, other modifications and variations may be made without departing from the spirit and scope of the present invention as set forth in the following claims.

What is claimed is:

1. A method for encoding a current contour based on one or more previously reconstructed contours of video image signals, comprising the steps of:

(a) choosing one of the previously reconstructed contours as a predicted contour for the current contour;

(b) overlapping the predicted contour with the current contour;

(c) finding matching segments between the predicted and the current contours and setting two end points of each matching segment as major vertices;

(d) widening the overlapped predicted contour and determining matching sections on the current contour, wherein each matching section represents a portion of the current contour overlapping with the widened contour between two major vertices;

(e) setting the two major vertices at the ends of each matching section as primary vertices;

(f) polygonal-approximating each non-matching section on the current contour, thereby determining secondary vertices on non-matching sections; and (g) encoding the current contour by representing each matching section by a portion of the predicted contour between two primary vertices of each matching section and the non-matching sections by the secondary vertices to thereby provide encoded current contour data.

2. The method according to claim 1, wherein said choosing step (a) includes the steps of:

(a1) calculating lengths of the current and the previously reconstructed contours;

(a2) comparing the length of the current contour with each of the lengths of the previously reconstructed contours to thereby determine one or more candidate contours among the previously reconstructed contours, a ratio between the lengths of the current contour and each candidate contour being within a predetermined range;

(a3) displacing each candidate contour by different amounts to thereby detect overlapping segments of the displaced contour and the current contour and computing a sum of lengths of the overlapping segments;

(a4) setting as an optimum contour a candidate contour corresponding to a largest sum of the lengths and providing a displacement yielding the largest sum as a motion vector; and (a5) moving the optimum contour by the motion vector to thereby generate the predicted contour.

3. The method according to claim 2, wherein lengths of said overlapping segments are greater than a predetermined threshold TH1.

4. The method according to claim 3, wherein said matching segments in step (c) are longer than a preset threshold TH2.

5. The method according to claim 4, wherein said thresholds TH1 and TH2 are of an identical value.

6. The method according to claim 1, wherein said polygonal-approximating step (f) is carried out based on a threshold Dmax.

7. The method according to claim 6, wherein a width of the widened contour corresponds to the threshold Dmax.

8. The method according to claim 2, wherein said encoded current data includes encoded motion vector and encoded primary and secondary vertices.

9. The method according to claim 1, wherein said video image signals includes a plurality of frames, and the current contour and the previously reconstructed contours belong to different frames.

10. A method for encoding a current contour based on a previously reconstructed contour, comprising the steps of:

(a) displacing either one of the current and the previously reconstructed contour toward the other contour by various amounts;

(b) finding overlapping segments of the current and the previously reconstructed contours at each displacement;

(c) setting overlapping segments greater than a predetermined threshold TH1 as matching segments;

(d) obtaining a sum of lengths of the matching segments at each displacement; and (e) determining a displacement which yields a sum of a largest magnitude as a motion vector of the current contour.

11. The method as recited in claim 10, further comprising, after said determining step (e), the steps of:

(f) overlapping the current and the previously reconstructed contours based on the motion vector to thereby generate an overlapped current contour and an overlapped previous contour;

(g) detecting overlapping portions of the overlapped current contour and the overlapped previous contour;

(h) comparing a length of each overlapping portion with a preset threshold TH2 and setting each overlapping portion longer than the TH2 as an overlapping section;

(i) setting two end points of each overlapping section as major vertices;

(j) widening the overlapped previous contour to generate a widened contour;

(k) detecting overlapping parts of the widened contour and the overlapped current contour between a pair of major vertices;

(l) comparing a length of each overlapping part with a preset threshold TH2 and setting each overlapping part whose length is greater than the TH2 as a matching section of the overlapped current contour;

(m) setting two major vertices at the ends of each matching section as primary vertices;

(n) polygonal-approximating each non-matching section of the overlapped current contour to thereby provide secondary vertices on the overlapped current contour; and (o) encoding the motion vector and position information of the primary and secondary vertices to thereby provide encoded data for the current contour.

12. The method as recited in claim 11, wherein said thresholds TH1 and TH2 have an identical value.

13. An apparatus for encoding a contour of an object in a current image frame based on a previous image frame, wherein the respective current and the previous image frames include one or more objects, each of the objects having a contour, comprising:

means for generating a global motion vector representing a displacement between the current and the previous image frames which yields a largest number of overlapping object pixels therebetween;

means for detecting contours of the objects in the previous image frame and setting the detected contours as previous contours;

means for choosing one of the contours in the current image frame as a current contour;

means for determining an optimum contour among the previous contours and setting a displacement between the current contour and the optimum contour as a local motion vector;

means for overlapping the optimum contour with the current contour based on the global and the local motion vectors to thereby generate an overlapping contour;

means for deciding matching segments of the overlapping contour and the current contour;

means for setting two end points of each matching segment as major vertices;

means for widening the overlapping contour to thereby provide a widened contour;

means for finding matching sections on the current contour and setting two end points of each matching section as primary vertices, each matching section representing a portion of the current contour overlapping with the widened contour between a pair of major vertices;

means for determining secondary vertices on non-matching sections of the current contour; and means for encoding the global motion vector, the local motion vector, and the primary and the secondary vertices to thereby provide encoded data of the current contour.

14. The apparatus according to claim 13, wherein said means for determining the optimum contour includes:

means for calculating a length of the current contour and lengths of previous contours positioned within a predetermined search range of the current contour;

means for determining candidate contours among the previous contours within the predetermined search range, a ratio between the lengths of the current contour and a candidate contour being within a predetermined range;

means for displacing each candidate contour by different amounts to thereby detect overlapping segments of the displaced contour with the current contour and computing a sum of lengths of overlapping segments which are greater than a threshold TH1; and means for generating as the optimum contour a candidate contour corresponding to a largest sum of the lengths and outputting a displacement yielding the largest sum as the local motion vector.

15. The apparatus according to claim 14, wherein said means for deciding the matching segments includes:

means for finding overlapping parts of the overlapping contour and the current contour; and means for setting overlapping parts which are greater than the threshold TH1 as the matching segments.

16. The apparatus according to claim 15, wherein each of the matching sections is longer than a preset threshold TH2.

17. The apparatus according to claim 16, wherein said secondary vertices are determined through the use of a polygonal approximation technique based on a threshold Dmax.

* * * * *